(12) United States Patent
Matsumura et al.

(10) Patent No.: US 11,700,609 B2
(45) Date of Patent: Jul. 11, 2023

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Kazuki Takeda, Tokyo (JP); Hideaki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 44 days.

(21) Appl. No.: 17/047,836

(22) PCT Filed: Apr. 12, 2019

(86) PCT No.: PCT/JP2019/015962
§ 371 (c)(1),
(2) Date: Oct. 15, 2020

(87) PCT Pub. No.: WO2019/203152
PCT Pub. Date: Oct. 24, 2019

(65) Prior Publication Data
US 2021/0160909 A1 May 27, 2021

(30) Foreign Application Priority Data

Apr. 19, 2018 (JP) .................................. 2018-091749

(51) Int. Cl.
*H04L 5/00* (2006.01)
*H04L 5/14* (2006.01)
(Continued)

(52) U.S. Cl.
CPC ........... *H04W 72/21* (2023.01); *H04L 5/0053* (2013.01); *H04W 72/23* (2023.01)

(58) Field of Classification Search
CPC ........... H04W 72/1284; H04W 72/042; H04W 72/27; H04W 72/50; H04W 72/52; H04L 5/0053
See application file for complete search history.

(56) References Cited

U.S. PATENT DOCUMENTS

| 2011/0070845 | A1* | 3/2011 | Chen | ........................ | H04L 5/001 |
|---|---|---|---|---|---|
| | | | | | 455/352 |
| 2011/0076962 | A1* | 3/2011 | Chen | ...................... | H04L 5/0053 |
| | | | | | 455/68 |
| 2014/0036810 | A1 | 2/2014 | Harrison | | |
| 2015/0139136 | A1* | 5/2015 | Zhang | ................... | H04L 5/0053 |
| | | | | | 370/329 |

(Continued)

FOREIGN PATENT DOCUMENTS

| CN | 110035524 | * 12/2017 | ............ H04W 72/04 |
|---|---|---|---|
| CN | 111742592 | * 2/2018 | ............ H04W 72/04 |

(Continued)

OTHER PUBLICATIONS

International Search Report issued in PCT/JP2019/015962 dated Jul 2, 2019 (1 page).

(Continued)

*Primary Examiner* — Diane L Lo
*Assistant Examiner* — Abusayeed M Haque
(74) *Attorney, Agent, or Firm* — Osha Bergman Watanabe & Burton LLP

(57) ABSTRACT

A terminal is disclosed including a receiver that receives, via higher layer signaling, configuration information regarding a physical uplink control channel (PUCCH) resource set containing one or more PUCCH resources; and a processor that determines a PUCCH resource associated with a value of a field in downlink control information. In other aspects, a radio communication method and a base station are also disclosed.

7 Claims, 8 Drawing Sheets

(51) Int. Cl.
*H04W 72/00* (2023.01)
*H04W 72/21* (2023.01)
*H04W 72/23* (2023.01)

(56) References Cited

U.S. PATENT DOCUMENTS

| | | | |
|---|---|---|---|
| 2016/0150508 A1* | 5/2016 | Golitschek Edler von Elbwart ... | H04W 72/23 370/329 |
| 2017/0195999 A1* | 7/2017 | Feng | H04W 72/23 |
| 2017/0245259 A1* | 8/2017 | Islam | H04L 5/0057 |
| 2017/0245260 A1* | 8/2017 | Islam | H04L 5/0048 |
| 2019/0335449 A1* | 10/2019 | Xiong | H04L 5/0051 |
| 2020/0404652 A1 | 12/2020 | Matsumura et al. | |

FOREIGN PATENT DOCUMENTS

| | | | | |
|---|---|---|---|---|
| EP | 3758427 A1 | 12/2020 | | |
| WO | 2014022690 A2 | 2/2014 | | |
| WO | WO-2016106905 A1 * | 7/2016 | ............ | H04L 1/1607 |
| WO | WO-2018128574 A1 * | 7/2018 | ......... | H04L 27/2602 |
| WO | WO-2018230137 A1 * | 12/2018 | ............ | H04L 1/0007 |
| WO | WO-2019135285 A1 * | 7/2019 | ............... | H04L 1/00 |

OTHER PUBLICATIONS

Written Opinion of the International Searching Authority issued in PCT/JP2019/015962 dated Jul. 2, 2019 (4 pages).
OPPO; "Summary of offline discussion on PUCCH resource allocation"; 3GPP TSG RAN WG1 Meeting 91, R1-1721685; Reno, USA; Nov. 27-Dec. 1, 2017 (8 pages).
Nokia, Nokia Shanghai Bell; "PUCCH Resource Allocation"; 3GPP TSG-RAN WG1 #91, R1-1720014; Reno, Nevada, USA; Nov. 27-Dec. 1, 2017 (12 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in Application No. 19788729.2 dated Dec. 15, 2021 (14 pages).
LG Electronics, "Consideration on resource allocation for NR-PUCCH", 3GPP TSG RAN WG1 Meeting #90, R1-1713181, Prague, Czech Republic, Aug. 21-25, 2017 (7 pages).
CATR, "UE procedure for reporting control information", 3GPP TSG RAN WG1 Meeting AH 1801, R1-1800762, Vancouver, Canada, Jan. 22-26, 2018 (4 pages).
Ericsson, "On PUCCH Resource Allocation and Other Issues", 3GPP TSG RAN WG1 Meeting AH 1801, R1-1800950, Vancouver, Canada, Jan. 22-26, 2018 (8 pages).
Ericsson, "On PUCCH Resource Allocation before RRC Connection", 3GPP TSG RAN WG1 Meeting #92, R1-1802909, Athens, Greece, Feb. 26-Mar. 2, 2018 (6 pages).
LG Electronics, "Remaining issues on PUCCH resource allocation", 3GPP TSG RAN WG1 Meeting #92bis, R1-1804557, Sanya, China, Apr. 16-20, 2018 (6 pages).
Motorola Mobility, Lenovo, "Remaining details on PUCCH resource allocation", 3GPP TSG RAN WG1 Meeting #92bis, R1-1804956, Sanya, China, Apr. 16-20, 2018 (3 pages).
Office Action issued in Indian Application No. 202037046872; dated Aug. 25, 2022 (6 pages).
Office Action issued for Taiwanese Application No. 108113591 dated May 3, 2022 (18 pages).

* cited by examiner

FIG. 2A

| PUCCH RESOURCE | CERTAIN FIELD VALUE IN DCI |
|---|---|
| PUCCH RESOURCE #0 | 000 |
| PUCCH RESOURCE #1 | 001 |
| PUCCH RESOURCE #2 | 010 |
| PUCCH RESOURCE #3 | 011 |
| PUCCH RESOURCE #4 | 100 |
| PUCCH RESOURCE #5 | 101 |
| PUCCH RESOURCE #6 | 110 |
| PUCCH RESOURCE #7 | 111 |

FIG. 2B

| PUCCH RESOURCE | CERTAIN FIELD VALUE IN DCI |
|---|---|
| PUCCH RESOURCE #0 | 000 |
| PUCCH RESOURCE #1 | 001 |
| PUCCH RESOURCE #2 | 010 |
| PUCCH RESOURCE #3 | 011 |

FIG. 2C

| PUCCH RESOURCE | CERTAIN FIELD VALUE IN DCI |
|---|---|
| PUCCH RESOURCE #0 | 000 |

TERMINAL, RADIO COMMUNICATION METHOD, AND BASE STATION

TECHNICAL FIELD

The present invention relates to a user terminal and a radio base station in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further widening a bandwidth and increasing speed compared to LTE, a successor system of LTE (also referred to as, for example, LTE-A (LTE-Advanced), FRA (Future Radio Access), 4G, 5G, 5G+ (plus), NR (New RAT), LTE Rel. 14, Rel. 15, and so on) is under study.

Existing LTE systems (for example, LTE Rel. 8 to Rel. 13) use 1-ms subframes (also referred to as transmission time interval (TTI) or the like) to perform downlink (DL) and/or uplink (UL) communication. The subframe is a transmission time unit for one channel-coded data packet and is used as a processing unit for scheduling, link adaptation, retransmission control (HARQ (Hybrid Automatic Repeat reQuest)), and so on.

In the existing LTE systems (for example, LTE Rel. 8 to Rel. 13), a user terminal uses an uplink control channel (for example, PUCCH (Physical Uplink Control Channel) or an uplink shared channel (for example, PUSCH (Physical Uplink Shared Channel)) to transmit uplink control information (UCI). A structure (format) of the uplink control channel is referred to as a PUCCH format or the like.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication Systems (for example, LTE Rel. 15 or later versions, 5G, 5G+, NR, and so on), determination of resources for the uplink control channel (for example, PUCCH resources), based on higher layer signaling and a certain field value in downlink control information (DCI) is under study, the determination being performed in a case where UCI is transmitted by using uplink control channel (for example, the PUCCH).

Specifically, in the future radio communication systems, it is assumed that, in a case where one or more sets (PUCCH resource sets) each including one or more PUCCH resources are reported to (configured for) a user terminal by higher layer signaling, the user terminal determines a PUCCH resource used for transmission of UCI, based on a certain field value in DCI, the PUCCH resource being included in a PUCCH resource set selected, based on a payload size (number of bits) of UCI.

However, in a case where the number of PUCCH resources included in the PUCCH resource set is limited to a certain value or larger, processing is complicated, leading to an increased load.

The present invention has been made in view of the above, and it is therefore an object of the present invention to provide a user terminal and a radio base station that can configure an uplink control channel resource set including an appropriate number of uplink control channel resources.

Solution to Problem

A user terminal according to an aspect of the present invention includes a receiving section that receives, via higher layer signaling, configuration information related to a physical uplink control channel (PUCCH) resource set including one or more physical uplink control channel (PUCCH) resources, and a control section that determines a PUCCH resource associated with a value of a certain field in downlink control information.

Advantageous Effects of Invention

According to the present disclosure, an uplink control channel resource set can be configured that includes an appropriate number of uplink control channel resources.

BRIEF DESCRIPTION OF DRAWINGS

FIGS. 2A to 2C are diagrams to show an example of a table showing association between PUCCH resources and certain field values in DCI;

DESCRIPTION OF EMBODIMENTS

Figure 1:
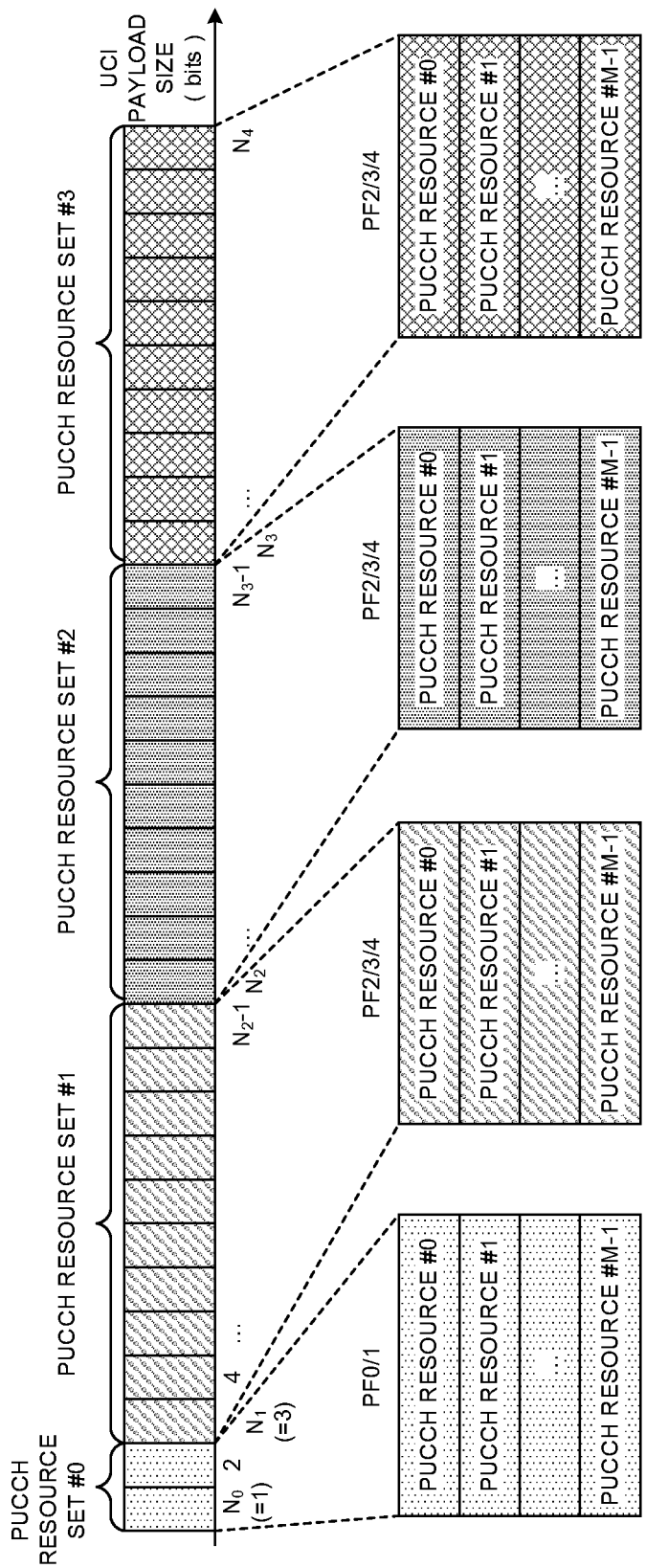
FIG. 1 is a diagram to show an example of allocation of PUCCH resources.

For future radio communication systems (for example, LTE Rel. 15 or later versions, 5G, NR, and so on), a configuration (also referred to as a format, a PUCCH format (PF), and so on) for an uplink control channel (for example, a PUCCH) used for transmission of UCI is under study. For example, for LTE Rel. 15, supporting five types PF0 to PF4 is under study. Note that the names of PFs referred to below are only illustrative and that different names may be used.

For example, PF0 and PF1 are PFs used for transmission of UCI of up to 2 bits (for example, transmission confirmation information (also referred to as HARQ-ACK (Hybrid Automatic Repeat reQuest-Acknowledge), ACK, NACK, or the like)). PF0 can be allocated to one or two symbols, and is thus also referred to as a short PUCCH, a sequence-based short PUCCH, or the like. On the other hand, PF1 can be allocated to 4 to 14 symbols, and is thus also referred to as a long PUCCH or the like. In PF1, a plurality of user terminals may be multiplexed by code division multiplexing (CDM) within the same PRB by block-wise spreading in a time domain using at least one of CS and OCC.

PF2 to PF4 are PFs used for transmission of the UCI (for example, channel state information (CSI) (or CSI and HARQ-ACK and/or scheduling request (SR))) of more than 2 bits. PF2 can be allocated to one or two symbols, and is thus also referred to as a short PUCCH or the like. On the other hand, PF3 and PF4 can be allocated to 4 to 14 symbols, and is thus also referred to as a long PUCCH or the like. In PF4, a plurality of user terminals may be multiplexed by the CDM using block-wise spreading (in a frequency domain) before DFT.

Resources (for example, PUCCH resources) used for transmission of the uplink control channel are allocated using higher layer signaling and/or downlink control information (DCI). Here, higher layer signaling may be, for example, at least one of RRC (Radio Resource Control) signaling, system information (for example, at least one of RMSI (Remaining Minimum System Information), OSI (Other System Information), MIB (Master Information Block), and SIB (System Information Block)), and broadcast information (PBCH (Physical Broadcast Channel)).

Specifically, one or more sets (PUCCH resource sets) each including one or more PUCCH resources are reported to (configured for) the user terminal by higher layer signaling. For example, K (for example, 1≤K≤4) PUCCH resource sets may be reported to the user terminal from a radio base station. Each PUCCH resource set may include M (for example, 8≤M≤32) PUCCH resource sets.

Based on the payload size of the UCI (UCI payload size), the user terminal may determine a single PUCCH resource set from the configured K PUCCH resource sets. The UCI payload size may be the number of bits in the UCI including no cyclic redundancy code (CRC) bits.

The user terminal may determine PUCCH resources used for transmission of the UCI, based on at least one of DCI and implicit information (also referred to as implicit indication information, implicit index, or the like) from the M PUCCH resources included in the determined PUCCH resource set.

FIG. 1 is a diagram to show an example of allocation of PUCCH resources. In FIG. 1, as an example, it is assumed that K=4 and that four PUCCH resource sets #0 to #3 are configured for the user terminal by the radio base station through higher layer signaling. Each of the PUCCH resource sets #0 to #3 is assumed to include M (for example, 8≤M≤32) PUCCH resources #0 to #M−1. Note that the PUCCH resource sets may include the same number of PUCCH resources or different numbers of PUCCH resources.

In FIG. 1, each of the PUCCH resources configured for the user terminal may include at least one of the following values of parameters (also referred to as fields, information, or the like). Note that, for each of the parameters, a range of possible values may be defined for each PUCCH format.

Symbol in which allocation for the PUCCH is started (start symbol)

Number of symbols allocated to the PUCCH within a slot (periods allocated to the PUCCH)

Index of a resource block (physical resource block (PRB)) in which allocation for the PUCCH is started Number of PRBs allocated to the PUCCH Whether frequency hopping is enabled for the PUCCH or not Frequency resource for a second hop in a case where frequency hopping is enabled, and the index of an initial cyclic shift (CS)

Index of an orthogonal spread code (for example, orthogonal cover code (OCC)) in the time domain, and the length (also referred to as an OCC length, a spreading rate, and so on) of an OCC used for block-wise spreading before discrete Fourier transform (DFT)

Index of an OCC used for block-wise spreading after DFT

As shown in FIG. 1, in a case where the PUCCH resource sets #0 to #3 are configured for the user terminal, the user terminal selects one of the PUCCH resource sets, based on the UCI payload size.

For example, in a case where the UCI payload size is 1 or 2 bits, the PUCCH resource set #0 is selected. In a case where the UCI payload size is equal to or more than 3 bits and equal to or less than $N_2-1$ bits, the PUCCH resource set #1 is selected. In a case where the UCI payload size is equal to or more than $N_2$ bits and equal to or less than $N_3-1$ bits, the PUCCH resource set #2 is selected. Similarly, in a case where the UCI payload size is equal to or more than $N_3$ bits and equal to or less than $N_4-1$ bits, the PUCCH resource set #3 is selected.

In this manner, the range of the UCI payload size for which the PUCCH resource set #i (i=0, . . . , K−1) is selected is represented as equal to or more than $N_i$ bits and equal to or less than $N_{i+1}-1$ bits (In other words, $\{N_i, \ldots, N_{i+1}-1\}$ bits).

Here, the start positions (start bit numbers) $N_0$ and $N_1$ of the UCI payload size for the PUCCH resource sets #0 and #1 may be 1 and 3, respectively. Accordingly, the PUCCH resource set #0 is selected in a case where the UCI of 2 bits or less is transmitted, and thus, the PUCCH resource set #0 may include PUCCH resource sets #0 to #M−1 for at least one of PF0 and PF1. On the other hand, one of the PUCCH resource sets #1 to #3 is selected in a case where the UCI of more than 2 bits is transmitted, and thus, the PUCCH resource sets #1 to #3 may include PUCCH resource sets #0 to #M−1 for at least one of PF2, PF3, and PF4.

For i=2, . . . , K−1, information (start position information) indicating the start position ($N_i$) of the payload size of the UCI for the PUCCH resource set #i may be reported to (configured for) the user terminal through higher layer signaling. The start position ($N_i$) may be specific to the user terminal. For example, the start position ($N_i$) may be configured with a value within a range from 4 or more bits to 256 or less bits (for example, a multiple of 4). For example, in FIG. 1, information indicating the start positions ($N_2$ and $N_3$) of the UCI payload size for the PUCCH resource sets #2 and #3 are reported to the user terminal through higher layer signaling (for example, RRC signaling specific to the user).

The maximum payload size of the UCI for each PUCCH resource set is provided by $N_K-1$. $N_K$ may be explicitly reported to (configured for) the user terminal through higher layer signaling and/or DCI or may be implicitly derived. For example, in FIG. 1, $N_0=1$ and $N_1=3$ may be defined in specifications, and $N_2$ and $N_3$ may be reported through higher layer signaling. $N_4$ may be defined in the specifications (for example, $N_4=1000$).

In a case illustrated in FIG. 1, the user terminal can determine a single PUCCH resource used for transmission of the UCI, based on the certain field in the DCI, the PUCCH resource being included in the PUCCH resources #0 to #M−1 included in the PUCCH resource set selected based on the UCI payload size.

The number M of PUCCH resources in one PUCCH resource set may be configured in the user terminal through higher layer signaling.

The PUCCH resources in the PUCCH resource set may be reported by a 3 bit field in the DCI.

In NR, M being 8 to 32 for PF0/1 is under study. M being 8 for PF2/3/4 is under study.

However, in a case where less than eight PUCCH resources in one PUCCH resource set are sufficient, limitation by the minimum value of M may increase complicatedness of and a load on the network (NW, gNB, and radio base station).

Thus, the inventors came up with the idea of a method for flexibly configuring the number of PUCCH resources in one PUCCH resource set. According to the method, a scheduler for the NW is simplified, allowing the complicatedness of and the load on the NW to be suppressed. Overhead (number of bits) of higher layer signaling (for example, RRC signaling) for configuration of the PUCCH resource set can be prevented from being increased.

Embodiments according to the present disclosure will be described in detail with reference to the drawings as follows.

Note that each of the PUCCH resources in each PUCCH resource set is intended to be explicitly reported to (configured for) the user terminal by the radio base station through higher layer signaling, but the embodiments are not limited to this. For example, at least one PUCCH resource in at least one PUCCH resource set may be defined in advance in the specifications or may be derived in the user terminal.

A case will be hereinafter mainly described where the number of bits (x) in a certain field in the DCI used to determine PUCCH resources is three. However, no such limitation is intended. Aspects described below are applicable to a case where a single PUCCH resource set selected from K PUCCH resource sets, based on the UCI payload size, includes PUCCH resources the number of which is larger than the X-th power of 2 (that is, M>2^X).

The certain field of the x bits may also be referred to as a PUCCH resource identifier (PUCCH resource indicator) field, an ACK/NACK resource identifier (ARI (ACK/NACK Resource Indicator), an ACK/NACK resource offset (ARO), a TPC command field, or the like.

The UCI may include at least one of transmission confirmation information (also referred to as, for example, retransmission control information, HARQ-ACK (Hybrid Automatic Repeat reQuest-Acknowledge), ACK/NACK (Acknowledge/Non-Acknowledge), and so on) for a downlink shared channel (for example, PDSCH (Physical Downlink Shared Channel), a scheduling request (SR) for an uplink shared channel (for example, the PUSCH), and channel state information (CSI).

(First Aspect)

In a first aspect, the number M of PUCCH resources included in the PUCCH resource set configured through higher layer signaling (for example, RRC signaling) may be smaller than 8.

For all of the K PUCCH resource sets configured through higher layer signaling, M may be smaller than 8.

The maximum number (for example, maxNrofPUCCH-ResourcesPerSet) of PUCCH resources per PUCCH resource set is configured, an RRC information element (for example, PUCCH-ResourceSet) for configuration of the PUCCH resource set includes a sequence of PUCCH resource IDs, and the minimum value of the number M of elements in the sequence need not be 8. For example, the minimum value of the number M of elements in the sequence may be 1 or any other number smaller than 8, such as 2 or 4. For example, the number M of elements in the sequence (size of the sequence) ranging from 1 to maxNrofPUCCH-ResourcesPerSet may be defined in the specifications.

According to the first aspect, by setting the number of PUCCH resources in the PUCCH resource set smaller than 8, the complicatedness of and the load in the NW can be prevented from being increased.

(Second Aspect)

In a second aspect, the DCI may be associated with the PUCCH resources.

In a case where the number M of PUCCH resources included in a specific PUCCH resource set is smaller than 8 (M is one of 1 to 7), the association between values of the certain field in the DCI and the PUCCH resources may be configured or defined in the specifications.

For the number M of PUCCH resources in the PUCCH resource set configured through higher layer signaling and selected, based on the UCI length, the UE does not expect (assume) a value of the certain field corresponding to M or more PUCCH resource IDs. For example, in a case where M of 4 is configured, the UE does not expect a value of 4 or larger in the certain field because the value of the certain field (PUCCH resource ID) is allowed to range from 0 to 3.

In a case of detecting DCI including a value of the certain field corresponding to M or more PUCCH resource IDs (PUCCH resource IDs not included in the selected PUCCH resource set) for the number M of PUCCH resources in the selected PUCCH resource set, the UE may ignore the certain field (need not use the certain field).

For some numbers of PUCCH resources, tables for association between certain field values and the PUCCH resources may be configured or defined in specifications. Such tables may be held by at least one of the UE and the gNB in advance. The configured, defined, or held tables may be tables for all of the configurable values for M or for some of the configurable values for M.

For example, as illustrated in FIG. 2A, FIG. 2B, and FIG. 2C, tables may be held by the UE and the gNB in advance for cases where a certain field length is constituted of 3 bits and where the values of M are 8, 4, and 1, respectively. For example, as illustrated in FIG. 2A and FIG. 2B, entries in each table may indicate corresponding values of the certain field in order of increasing PUCCH resource ID. In a table for M of 4, the certain field length may be constituted of 2 bits. In a table for M of 1, the certain field length may be constituted of 1 bit. The table for M of 1 may include no values of the certain field and indicating one PUCCH resource. In this case, the UE may determine the one PUCCH resource indicated in the table regardless of the DCI. A table for M of 2 may be held by the UE and the gNB in advance. In this case, the certain field length may be constituted of 1 bit.

The certain field length may vary depending on the number of PUCCH resources included in the PUCCH resource set configured through higher layer signaling or the number of PUCCH resources in the PUCCH resource set configured through higher layer signaling and selected, based on the UCI length. In a case where the numbers of PUCCH resources included in a plurality of PUCCH resource sets configured through higher layer signaling vary, the certain field length may be determined according to the maximum value of the numbers of PUCCH resources included in a plurality of PUCCH resource set configured through higher layer signaling. The numbers of PUCCH resources included in a plurality of PUCCH resource sets configured through higher layer signaling may be equal.

One of the number of PUCCH resources included in the PUCCH resource set configured through higher layer signaling, the maximum number of PUCCH resources included in each of a plurality of PUCCH resource sets configured through higher layer signaling, and the number of PUCCH resources included in the PUCCH resource set configured through higher layer signaling and selected based on the UCI length, may be set as target PUCCH resource sets, the certain field length may be determined according to the number of target PUCCH resources. In a case where the number of the target PUCCH resources is n-th power of 2 or smaller, the certain field length may be n. In a case where the number of the target PUCCH resources is 1, the certain field length may be 0. In a case where the number of the target PUCCH resources is 2, the certain field length may be 1. In a case where the number of the target PUCCH resources is 3 to 4, the certain field length may be 2. In a case where the number of the target PUCCH resources is larger than 4, the certain field length may be 3.

At least one of the UE and gNB may hold only the table for M of 8, and the number M of PUCCH resources in a specific PUCCH resource set may be equal to or smaller than 8, or may be smaller than 8. The UE may use the table to determine the PUCCH resource corresponding to the value of the certain field. For example, in a case where the selected PUCCH resource set has an M of 4, the PUCCH resource corresponding to the value of the received certain field is determined from the PUCCH resources #0 to #3 in the table in FIG. 2A.

Instead of the certain field, a combination of the certain field and the implicit indication information may be used. In this case, in each table, the PUCCH resource ID may be associated with a combination of the value of the certain field and the value of the implicit indication information.

According to a second aspect, even in a case where the number M of PUCCH resources included in the PUCCH resource set configured through higher layer signaling is smaller than 8, the UE can appropriately determine the PUCCH resources, based on the DCI.

(Radio Communication System)

Hereinafter, a structure of a radio communication system according to the present embodiment will be described. The radio communication method according to each of the aspects described above is applied to this radio communication system. Note that the radio communication methods according to the aspects described above may be employed independently or at least two of the methods may be employed in combination.

Figure 3:
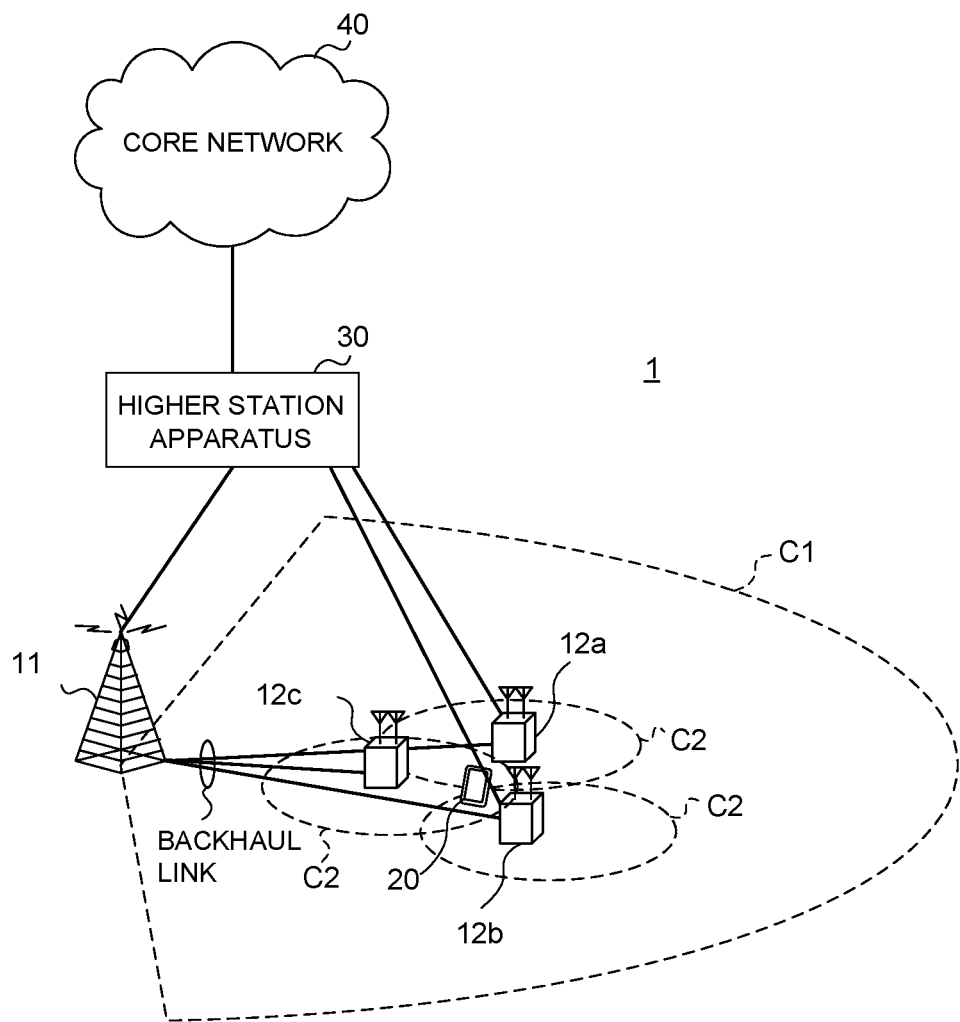
FIG. 3 is a diagram to show an example of a schematic structure of a radio communication system according to the present embodiment.

FIG. 3 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit. Note that the radio communication system 1 may also be referred to as SUPER 3G, LTE-A (LTE-Advanced), IMT-Advanced, 4G, 5G, FRA (Future Radio Access), NR (New RAT (New Radio Access Technology)), and so on.

The radio communication system 1 shown in FIG. 3 includes a radio base station 11 that forms a macro cell C1, and radio base stations 12a to 12c that form small cells C2, which are located within the macro cell C1 and which are narrower than the macro cell C1. User terminals 20 are located in the macro cell C1 and respective small cells C2. Different numerologies may be applied among the cells and/or within each cell.

Here, numerologies are communication parameters in a frequency direction and/or a time direction (for example, at least one of a subcarrier spacing, a bandwidth, a symbol length, a CP duration (CP length), a subframe length, a TTI duration (TTI length), the number of symbols per TTI, a radio frame structure, filter processing, windowing processing, and so on). In the radio communication system 1, a subcarrier spacing of, for example, 15 kHz, 30 kHz, 60 kHz, 120 kHz, or 240 kHz may be supported.

The user terminals 20 can connect with both the radio base station 11 and the radio base stations 12. The user terminals 20 are assumed to simultaneously use, based on CA or DC, the macro cell C1 and the small cells C2 using different frequencies. The user terminals 20 can apply CA or DC by using a plurality of cells (CCs) (for example, two or more CCs). The user terminals can utilize, as a plurality of cells, licensed band CCs and unlicensed band CCs.

The user terminals 20 can perform communication by using time division duplex (TDD) or frequency division duplex (FDD) in each cell. TDD cells and FDD cells may be respectively referred to as TDD carriers (frame structure type 2), FDD carriers (frame structure type 1), or the like.

In each cell (carrier), a single numerology may be employed, or a plurality of different numerologies may be employed.

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, an optical fiber in compliance with the CPRI (Common Public Radio Interface), an X2 interface, and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that examples of the higher station apparatus 30 may include access gateway apparatus, a radio network controller (RNC), a mobility management entity (MME) and so on, but are by no means limited to these. Each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs,"

"transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE, LTE-A, 5G, and NR, and may include not only mobile communication terminals but stationary communication terminals. Each of the user terminals 20 can perform device-to-device communication (D2D) with another user terminal 20.

In the radio communication system 1, as radio access schemes, orthogonal frequency division multiple access (OFDMA) can be applied to the downlink (DL), and single carrier frequency division multiple access (SC-FDMA) can be applied to the uplink (UL). OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands constituted of one or continuous resource blocks per terminal, and allowing a plurality of terminals to use mutually different bands. Note that the uplink and downlink radio access schemes are by no means limited to the combinations of these, and the OFDMA may be used in the UL.

The radio communication system 1 may use a multicarrier waveform (for example, an OFDM waveform) or a single carrier waveform (for example, a DFT-s-OFDM waveform).

In the radio communication system 1, a downlink shared channel (also referred to as a PDSCH (Physical Downlink Shared Channel), DL data channel, and the like), which is used by each user terminal 20 on a shared basis, a broadcast channel (PBCH (Physical Broadcast Channel)) L1/L2 control channels and so on, are used as DL channels. User data, higher layer control information, SIBs (System Information Blocks) and so on are communicated on the PDSCH. The MIBs (Master Information Blocks) are communicated on the PBCH.

The L1/L2 control channels include a DL control channel (PDCCH (Physical Downlink Control Channel)), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and PUSCH scheduling information, and so on are communicated on the PDCCH. The number of OFDM symbols to use for the PDCCH is communicated on the PCFICH. The EPDCCH is frequency-division multiplexed with the PDSCH and used to communicate DCI and so on, like the PDCCH. HARQ retransmission control information (ACK/NACK) in response to the PUSCH can be communicated in at least one of the PHICH, the PDCCH, and the EPDCCH.

The radio communication system 1 uses, as UL channels, a UL shared channel (also referred to as a PUSCH (Physical Uplink Shared Channel), an uplink shared channel, and the like), which is used by each user terminal 20 on a shared basis, an uplink control channel (PUCCH (Physical Uplink Control Channel)), a random access channel (PRACH (Physical Random Access Channel)) and so on. User data and higher layer control information are communicated on the PUSCH. Uplink control information (UCI) including at least one of DL signal retransmission control information (A/N) and channel state information (CSI), and so on is communicated in the PUSCH or PUCCH. By means of the PRACH, random access preambles for establishing connections with cells can be communicated.

<Radio Base Station>

Figure 4:
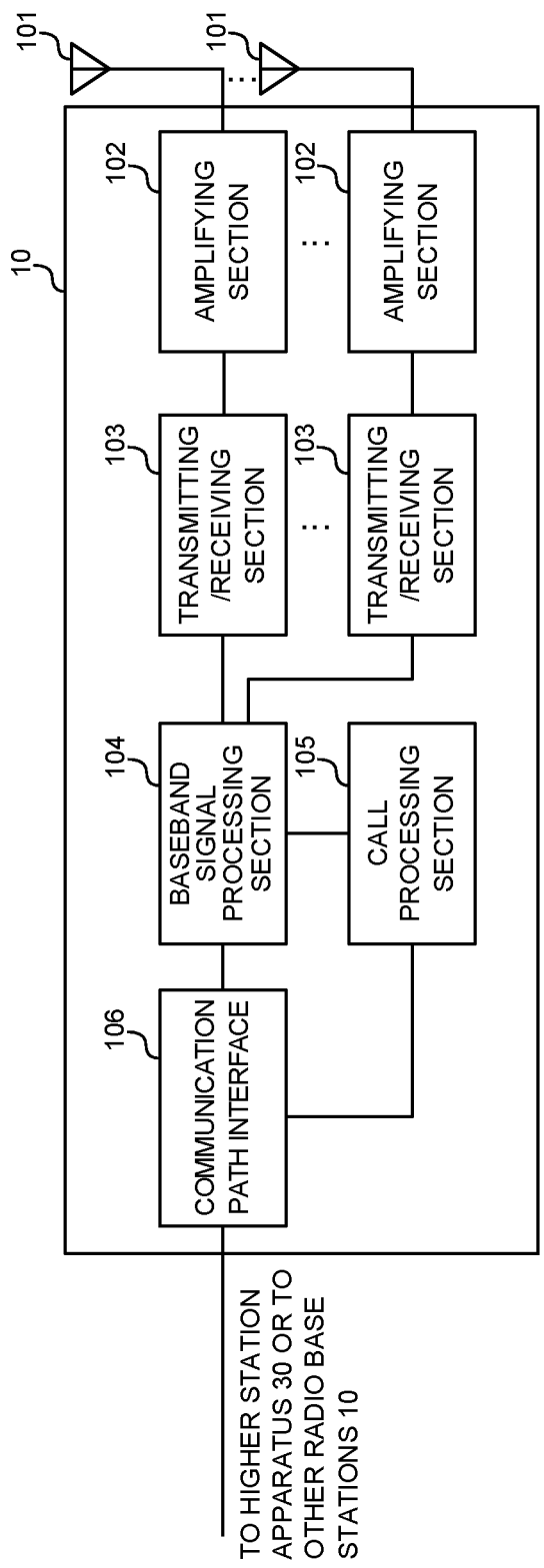
FIG. 4 is a diagram to show an example of an overall structure of a radio base station according to the present embodiment.

FIG. 4 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the DL is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process, and a precoding process, and the result is forwarded to each transmitting/receiving section 103. Downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The transmitting/receiving sections 103 convert the received signals into the baseband signal through frequency conversion and outputs to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing such as setting up and releasing for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with adjacent radio base stations 10 via an inter-base station interface (for example, an optical fiber in compliance with the CPRI (Common Public Radio Interface) and an X2 interface).

The transmitting/receiving section 103 transmits DL signals (including at least one of DL data signals, DL control signals, and DL reference signals) to the user terminal 20, and receives UL signals (including at least one of UL data signals, UL control signals, and UL reference signals) from the user terminal 20.

The transmitting/receiving section 103 uses the uplink shared channel (for example, the PUSCH) or the uplink control channel (for example, the short PUCCH and/or the long PUCCH) to receive the UCI from the user terminal 20. The UCI may include at least one of HARQ-ACK for a DL data channel (for example, the PDSCH), CSI, SR, beam identification information (for example, a beam index (BI)), and a buffer status report (BSR).

The transmitting/receiving section 103 may transmit control information (for example, at least one of a format, the number of PUCCH units in a slot, the size of a PUCCH unit, a multiplexing method for RSs, the mapping positions of RSs, the presence (or absence) of RSs, the density of RSs, the presence (or absence) of SRSs, and a resource for the uplink control channel) related to the uplink control channel (for example, the short PUCCH or the long PUCCH) by using physical layer signaling (L1 signaling) and/or higher layer signaling.

Figure 5:
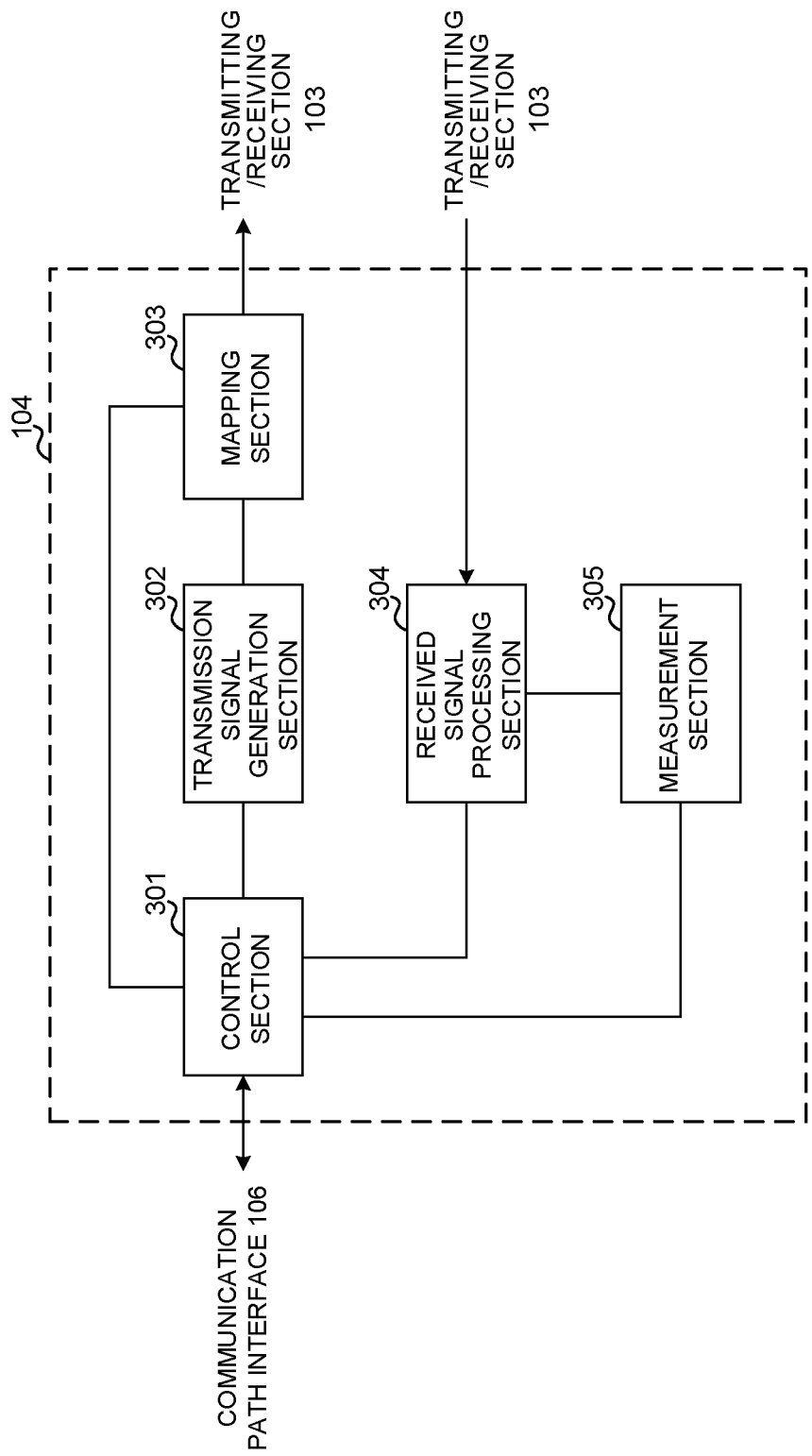
FIG. 5 is a diagram to show an example of a functional structure of the radio base station according to the present embodiment.

FIG. 5 is a diagram to show an example of a functional structure of the radio base station according to the present embodiment. Note that, the figure primarily shows functional blocks that pertain to characteristic parts of the present embodiment, and it is assumed that the radio base station 10 may include other functional blocks that are necessary for radio communication as well. As shown in the figure, the baseband signal processing section 104 includes a control section 301, a transmission signal generation section 302, a mapping section 303, a received signal processing section 304, and a measurement section 305.

The control section 301 controls the whole of the radio base station 10. The control section 301, for example, controls the generation of DL signals by the transmission signal generation section 302, the mapping of DL signals by the mapping section 303, a receiving process (for example, demodulation) for UL signals by the received signal processing section 304, and measurements by the measurement section 305.

Specifically, the control section 301 schedules the user terminal 20. Specifically, the control section 301 may perform scheduling and/or retransmission control of the DL data and/or uplink shared channel, based on the UCI (for example, CSI and/or BI) from the user terminal 20.

The control section 301 may control the structure (format) of the uplink control channel (for example, the long PUCCH and/or short PUCCH) to cause the control information related to the uplink control channel to be transmitted.

The control section 301 may control configuration of PUCCH resources. Specifically, the control section 301 may control to cause K PUCCH resource sets each including M PUCCH resources to be configured in the user terminal, based on the payload size of the UCI.

The control section 301 may control the receiving process for the UCI using the PUCCH resource determined in the user terminal, based on the certain field value and/or implicit indication information in the DCI. The control section 301 may control blind detection of the PUCCH resources.

The control section 301 may control the received signal processing section 304 to perform the receiving process for the UCI from the user terminal 20, based on the format of the uplink control channel.

The control section 301 may configure a resource set (PUCCH resource set) in the user terminal 20, based on higher layer signaling (for example, RRC signaling), determine a transmission resource (PUCCH resource) used for the uplink control channel from the resource set, and control transmission of downlink control information (DCI) including the certain field value corresponding to the transmission resource. The number of resources included in the resource set may be smaller than 8.

The control section 301 can be constituted with a controller, a control circuit or control apparatus that can be described based on general understanding of the technical field to which the present invention pertains.

The transmission signal generation section 302 generates DL signals (including DL control signals, DL data signals, and DL reference signals), based on commands from the control section 301 and outputs the downlink signals to the mapping section 303.

The transmission signal generation section 302 can be a signal generator, a signal generation circuit or signal generation apparatus that can be described based on general understanding of the technical field to which the present invention pertains.

The mapping section 303 maps the DL signals generated in the transmission signal generation section 302 to certain radio resources, based on commands from the control section 301, and outputs these to the transmitting/receiving sections 103. The mapping section 303 can be a mapper, a mapping circuit or mapping apparatus that can be described based on general understanding of the technical field to which the present invention pertains.

The received signal processing section 304 performs receiving processes (for example, demapping, demodulation, decoding, and so on) on UL signals (including, for example, UL data signals, UL control signals, and UL reference signals) transmitted from the user terminal 20. Specifically, the received signal processing section 304 may output, to the measurement section 305, the received signals and/or the signals resulting from the receiving processes. The received signal processing section 304 performs the receiving process for the UCI, based on the uplink control channel structure indicated by the control section 301.

The measurement section 305 conducts measurements with respect to the received signals. The measurement section 305 can be constituted with a measurer, a measurement circuit or measurement apparatus that can be described based on general understanding of the technical field to which the present invention pertains.

The measurement section 305 may measure UL channel quality, based on, for example, received power (for example, RSRP (Reference Signal Received Power)) and/or received quality (for example, RSRQ (Reference Signal Received Quality)) of UL reference signals. The measurement results may be output to the control section 301.

<User Terminal>

Figure 6:
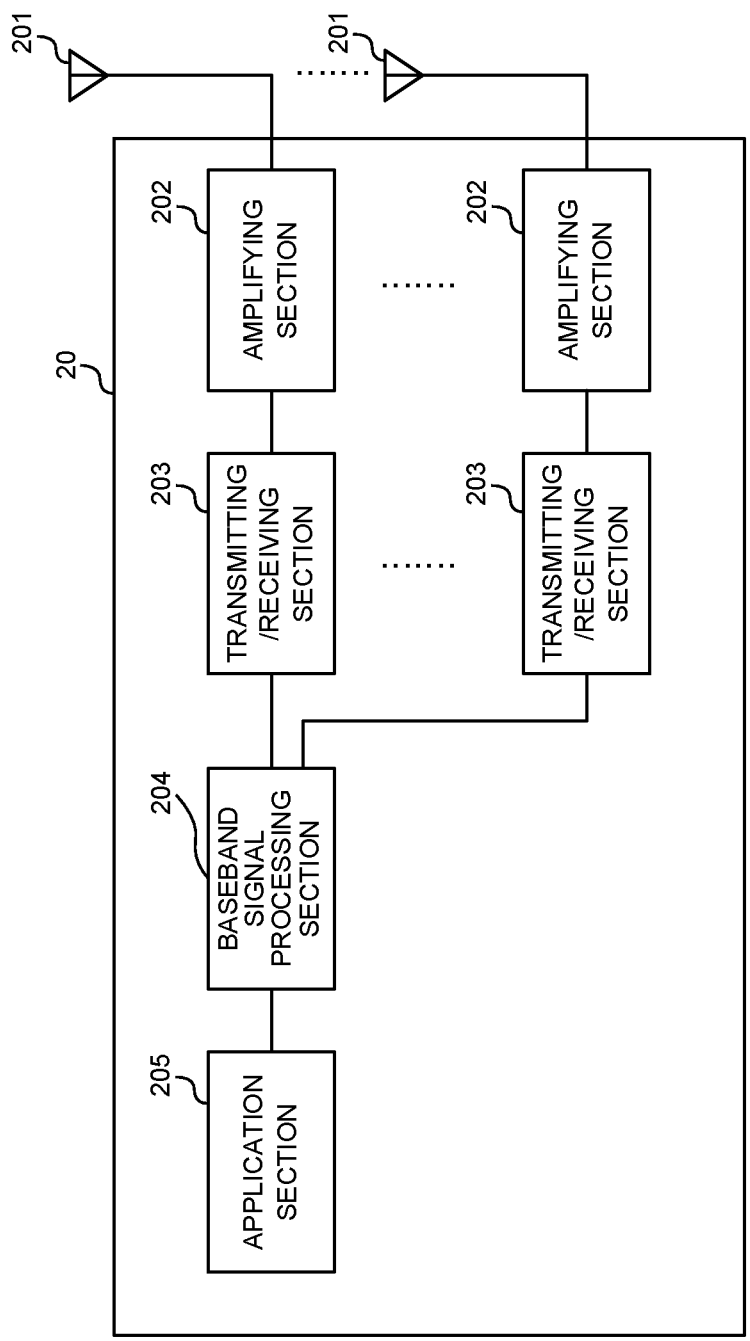
FIG. 6 is a diagram to show an example of an overall structure of a user terminal according to the present embodiment.

FIG. 6 is a diagram to show an example of an overall structure of a user terminal according to the present embodiment. The user terminal 20 includes a plurality of transmitting/receiving antennas 201 for MIMO transmission, amplifying sections 202, transmitting/receiving sections 203, a baseband signal processing section 204 and an application section 205.

Radio frequency signals that are received in the plurality of transmitting/receiving antennas 201 are amplified in the respective amplifying sections 202. Each of the transmitting/receiving sections 203 receives the DL signal amplified in the amplifying section 202. The transmitting/receiving sections 203 convert the received signals into baseband signals through frequency conversion, and output the baseband signals to the baseband signal processing section 204.

The baseband signal processing section 204 performs, on each input baseband signal, an FFT process, error correction decoding, a retransmission control receiving process, and so on. The DL data is forwarded to the application section 205. The application section 205 performs processes related to higher layers above the physical layer and the MAC layer, and so on. Broadcast information is also forwarded to the application section 205.

Meanwhile, the UL data is input from the application section 205 to the baseband signal processing section 204. The baseband signal processing section 204 performs a retransmission control transmission process (for example, an HARQ transmission process), channel coding, rate matching, puncture, a discrete Fourier transform (DFT) process, an IFFT process and so on, and the result is forwarded to each transmitting/receiving section 203. At least one of the channel coding, rate matching, puncture, DFT process, and IFFT process is also performed on the UCI, and the result is forwarded to each transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving section 203 receives DL signals (including DL data signals, DL control signals (DCI), and DL reference signals) of the numerology configured in the user terminal 20, and transmits the UL signals (including the UL data signals, UL control signals, and UL reference signals) of the numerology.

The transmitting/receiving section 203 uses the uplink shared channel (for example, the PUSCH) or the uplink control channel (for example, the short PUCCH and/or the long PUCCH) to transmit the UCI to the radio base station 10.

The transmitting/receiving section 203 may receive information indicating K PUCCH resource sets each including M PUCCH resources. The transmitting/receiving section 203 may receive higher layer control information (higher layer parameters).

The transmitting/receiving sections 203 can be transmitters/receivers, transmitting/receiving circuits or transmitting/receiving apparatus that can be described based on general understanding of the technical field to which the present invention pertains. The transmitting/receiving section 203 may be structured as a transmitting/receiving section in one entity, or may be constituted with a transmitting section and a receiving section.

Figure 7:
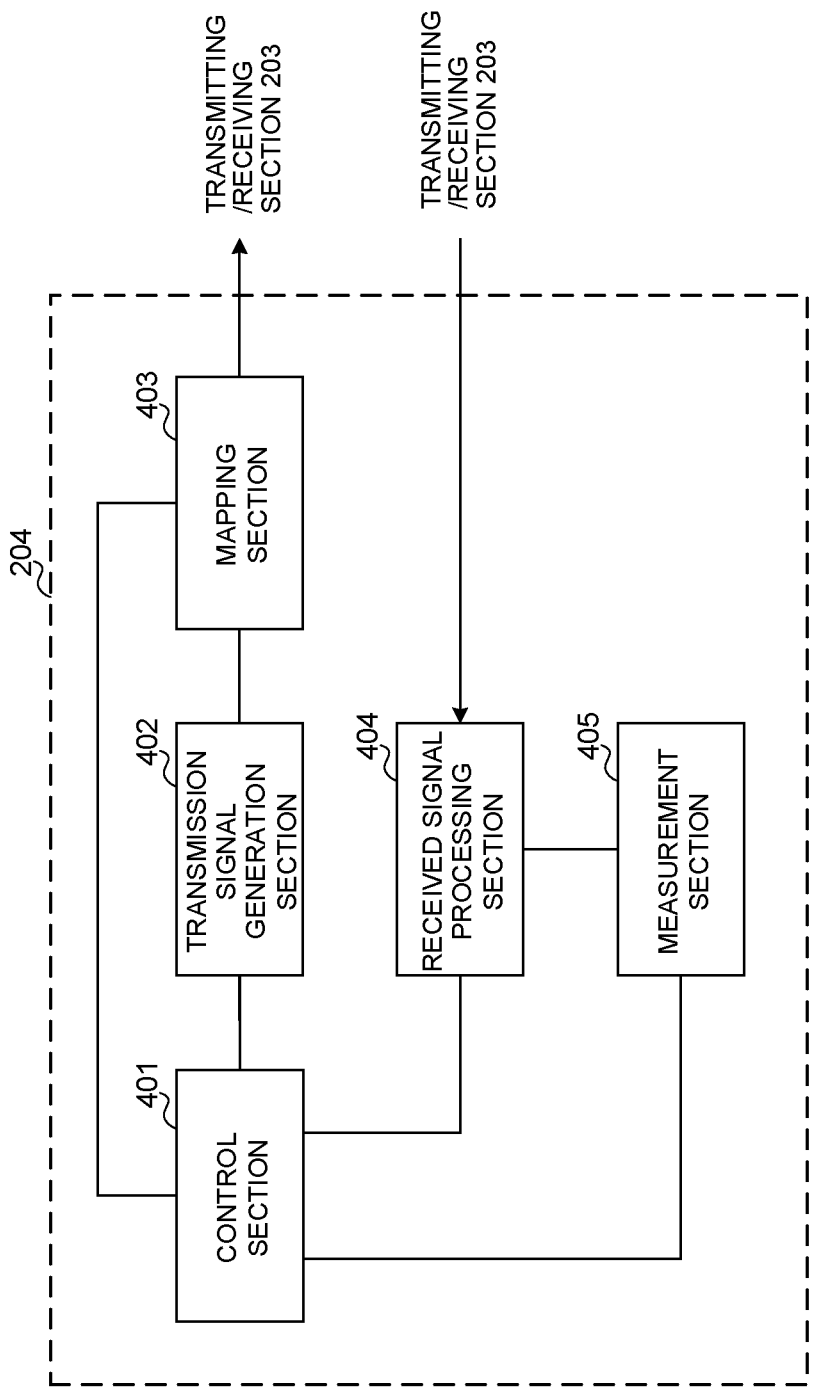
FIG. 7 is a diagram to show an example of a functional structure of the user terminal according to the present embodiment.

FIG. 7 is a diagram to show an example of a functional structure of a user terminal according to the present embodiment. Note that this figure primarily shows functional blocks that pertain to characteristic parts of the present embodiment, and it is assumed that the user terminal 20 may include other functional blocks that are necessary for radio communication as well. As shown in the figure, the baseband signal processing section 204 provided in the user terminal 20 includes a control section 401, a transmission signal generation section 402, a mapping section 403, a received signal processing section 404 and a measurement section 405.

The control section 401 controls the whole of the user terminal 20. The control section 401, for example, controls the generation of UL signals by the transmission signal generation section 402, the mapping of UL signals by the mapping section 403, a receiving process for DL signals by the received signal processing section 404, measurements by the measurement section 405, and so on.

The control section 401 controls the uplink control channel used for transmission of the UCI from the user terminal 20, based on explicit indications from the radio base station 10 or implicit determinations in the user terminal 20. The control section 401 controls the transmission of the UCI.

The control section 401 may control the structure (format) of the uplink control channel (for example, the long PUCCH and/or short PUCCH). The control section 401 may control the format of the uplink control channel, based on the control information from the radio base station 10. The control section 401 may control the PUCCH format (format of the uplink control channel) used for transmission of the UCI, based on the control information related to fallback.

The control section 401 may determine a resource set (PUCCH resource set), based on higher layer signaling (for example, RRC signaling), and determine a transmission resource (PUCCH resources) used for the uplink control channel (PUCCH), from the resource set, based on the certain field value in the downlink control information (DCI). The number (for example, M) of resources included in the resource set may be smaller than 8.

The control section 401 may be configured with a plurality of resource sets through higher layer signaling. Each of the plurality of resource sets may include at least one resource. The control section 401 may determine the resource set from the plurality of resource sets, based on the length of the uplink control information.

Based on associations (for example, a table) between eight or more (for example, eight) resources and the certain field values, the control section 401 may determine the resource corresponding to the above-described certain field value as the transmission resource.

Based on associations (for example, a table) between less than eight resources (for example, four or two resources or one resource) and the certain field values, the control section 401 may determine the resource corresponding to the above-described certain field value as the transmission resource.

In a case of detecting downlink control information having a certain field value corresponding to a resource not included in the resource set, the control section 401 need not use the detected downlink control information.

The control section 401 can be constituted with a controller, a control circuit or control apparatus that can be described based on general understanding of the technical field to which the present invention pertains.

The transmission signal generation section 402 generates (performs, for example, encoding, rate matching, puncturing, modulation, and so on of) UL signals (including UL data signals, UL control signals, UL reference signals, and UCI), based on commands from the control section 401 and outputs the UL signals to the mapping section 403. The transmission signal generation section 402 can be constituted with a signal generator, a signal generation circuit or signal generation apparatus that can be described based on general understanding of the technical field to which the present invention pertains.

The mapping section 403 maps the UL signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding, and so on) on DL signals (DL data signals, scheduling information, DL control signals, and DL reference signals). The received signal processing section 404 outputs, to the control section 401, the information received from the radio base station 10. The received signal processing section 404 outputs, to the control section 401, for example, broadcast information, system information, higher layer control information through higher layer signaling such as RRC signaling, physical layer control information (L1/L2 control information), and so on.

The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The measurement section 405 measures a channel state, based on reference signals (for example, CSI-RSs) from the radio base station 10, and outputs measurement results to the control section 401. Note that the measurement of the channel state may be performed for each CC.

The measurement section 405 can be constituted with a signal processor, a signal processing circuit or signal processing apparatus, or a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of at least one of hardware and software. The method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 8:
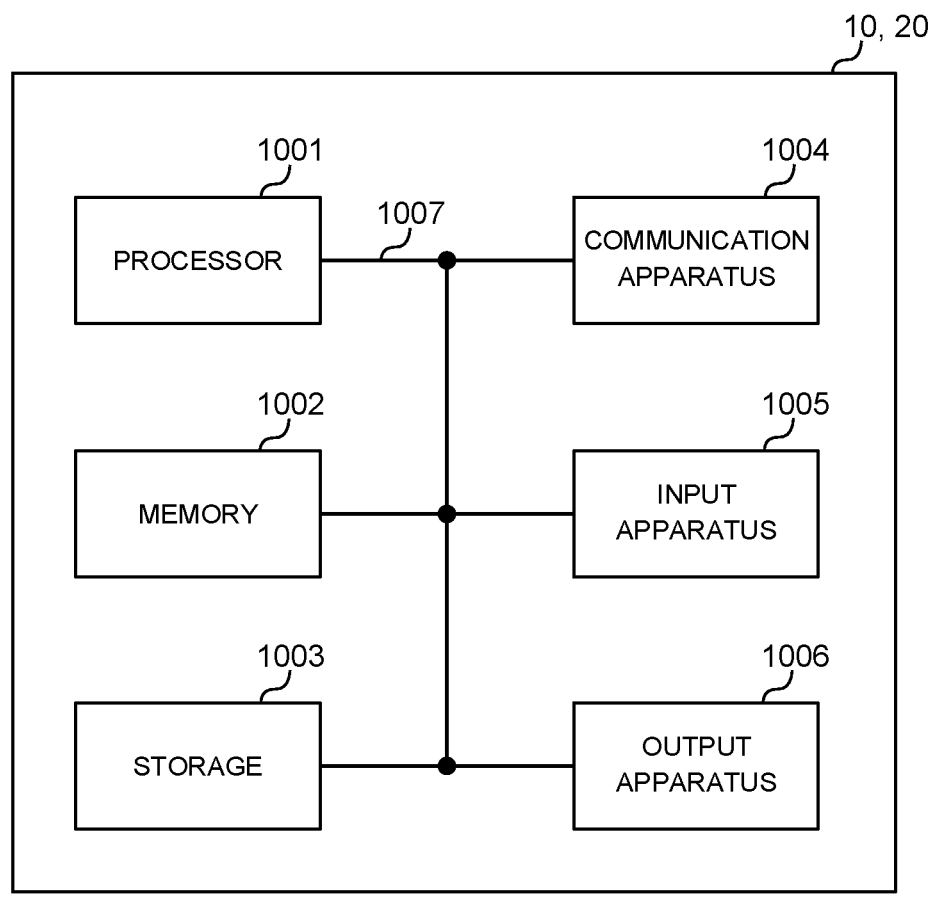
FIG. 8 is a diagram to show an example of a hardware structure of the radio base station and the user terminal according to the present embodiment.

For example, a radio base station, a user terminal, and so on according to one embodiment of the present disclosure may function as a computer that executes the processes of the radio communication method of the present disclosure. FIG. 8 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and/or "symbols" may be replaced by "signals" ("signaling"). "Signals" may be "messages." A reference signal may be abbreviated as an "RS," and may be referred to as a "pilot," a "pilot signal," and so on, depending on which standard applies. A "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols the number of which is smaller than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, codewords, or the like, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

An RB may include one or a plurality of symbols in the time domain, and may be one slot, one mini-slot, one subframe, or one TTI in length. One TTI and one subframe each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

The information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure may be used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," a "bandwidth part (BWP)" and so on can be used interchangeably. The base station may be referred to as the terms such as a "macro cell," a small cell," a "femto cell," a "pico cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," "terminal" and so on may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

The radio base station in the present disclosure may be interpreted as a user terminal. For example, each aspect/embodiment of the present disclosure may be applied to the structure that replaces a communication between a radio base station and a user terminal with a communication between a plurality of user terminals (for example, which may be referred to as "D2D (Device-to-Device)," "V2X (Vehicle-to-Everything)," and the like). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on JP 2018-091749 filed on Apr. 19, 2018. The contents are entirely incorporated herein.

What is claimed is:

1. A terminal comprising:
a receiver that receives, via higher layer signaling, configuration information regarding a physical uplink control channel (PUCCH) resource set containing one or more PUCCH resources; and
a processor that determines a PUCCH resource associated with a value of a field in downlink control information,
wherein
in response to a number M of PUCCH resources contained in the PUCCH resource set being less than eight, the processor determines the PUCCH resource, associated with the value out of eight values of the field consisting of three bits, in which the eight values are respectively associated with eight PUCCH resources, from a first through M-th PUCCH resources out of the eight PUCCH resources.

2. The terminal according to claim 1, wherein
the configuration information indicates a plurality of PUCCH resource sets, and
a minimum number of PUCCH resources included in each of the plurality of PUCCH resource sets is one.

3. The terminal according to claim 1, wherein the processor assumes that the value of the field does not exceed the number M of PUCCH resources.

4. The terminal according to claim 1, wherein a PUCCH format is based on the configuration information regarding the PUCCH resource set.

5. A radio communication method for a terminal comprising:
receiving, via higher layer signaling, configuration information regarding a physical uplink control channel (PUCCH) resource set containing one or more PUCCH resources; and
determining a PUCCH resource associated with a value of a field in downlink control information,
wherein in response to a number M of PUCCH resources contained in the PUCCH resource set being less than eight, the terminal determines the PUCCH resource, associated with the value out of eight values of the field consisting of three bits, in which the eight values are respectively associated with eight PUCCH resources, from a first through M-th PUCCH resources out of the eight PUCCH resources.

6. A base station comprising:
a transmitter that transmits, via higher layer signaling, configuration information regarding a physical uplink control channel (PUCCH) resource set containing one or more PUCCH resources; and
a processor that controls reception of a PUCCH transmitted by using a PUCCH resource associated with a value of a field in downlink control information,
wherein
in response to a number M of PUCCH resources contained in the PUCCH resource set being less than eight, the PUCCH resource, associated with the value out of eight values of the field consisting of three bits, in which the eight values are respectively associated with eight PUCCH resources, is determined from a first through M-th PUCCH resources out of the eight PUCCH resources.

7. A system comprising a terminal and a base station, wherein:
the terminal comprises:
a receiver that receives, via higher layer signaling, configuration information regarding a physical uplink control channel (PUCCH) resource set containing one or more PUCCH resources; and
a processor that determines a PUCCH resource associated with a value of a field in downlink control information,
wherein
in response to a number M of PUCCH resources contained in the PUCCH resource set being less than eight, the processor determines the PUCCH resource, associated with the value out of eight values of the field consisting of three bits, in which the eight values are respectively associated with eight PUCCH resources, from a first through M-th PUCCH resources out of the eight PUCCH resources, and
the base station comprises:
a transmitter that transmits, via the higher layer signaling, the configuration information; and
a processor that controls reception of the PUCCH transmitted by using the PUCCH resource associated with the value of the field in the downlink control information.

* * * * *